US000001850H

United States Statutory Invention Registration [19]

[11] Reg. Number: H1,850

Zimmermann

[45] Published: Jun. 6, 2000

[54] JOYSTICK HAVING ELECTRONICALLY CONTROLLED CENTERING FORCE FEEDBACK

[75] Inventor: Daniel E. Zimmermann, Peoria, Ill.

[73] Assignee: Caterpillar Inc., Peoria, Ill.

[21] Appl. No.: 09/220,238

[22] Filed: Dec. 23, 1998

[51] Int. Cl.[7] ..... G05G 9/00

[52] U.S. Cl. ..... 74/471 XY

*Primary Examiner*—Daniel T. Pihulic
*Attorney, Agent, or Firm*—David H. Chervitz

[57] ABSTRACT

A joystick is disclosed which comprises an operator member mounted to a pivotal member, the operator member for moving the pivotal member, a position sensor associated with the pivotal member, a linear solenoid having a pair of plunger members each being positioned within the solenoid on opposite sides of the solenoid, and a cable member connected to the operator member and the plunger members with the cable member for centering the operator member when the solenoid is energized.

20 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

JOYSTICK HAVING ELECTRONICALLY CONTROLLED CENTERING FORCE FEEDBACK

TECHNICAL FIELD

This invention relates generally to a joystick for controlling a hydraulic system and more particularly to a joystick having electronically controlled centering force feedback.

BACKGROUND ART

In present hydraulic systems, such as pilot valve hydraulic systems, a joystick is used to control operation thereof. Such joysticks have force feedback as part of their operational characteristics. This tactile feedback provides an operator with information concerning how much force the machine function is exerting. Although such pilot valve hydraulic systems have been useful in the past, there is a new generation of controls which are all electronic. The electric controls allow for additional advanced functions such as coordinated motion between axis to the operator with much higher levels of flexibility than has been previously provided. However, with the electric controls the tactile feedback to the operation is completely lost. The operator has no knowledge or feel for how much force is being exerting by the machine.

In view of the above, it would be desirable to provide a joystick which is electronic and provides for tactile feedback to an operator. Further, it would be advantageous to provide a joystick which is capable of providing a residual centering force prior to operation or actuation of the joystick.

Accordingly, the present invention is directed to overcoming one or more of the problems as set forth above.

DISCLOSURE OF THE INVENTION

In one embodiment of the present invention, a joystick is disclosed which comprises an operator member mounted to a pivotal member, the operator member for moving the pivotal member, a position sensor associated with the pivotal member, a linear solenoid having a pair of plunger members each being positioned within the solenoid on opposite sides of the solenoid, and a cable member connected to the operator handle and the plunger members with the cable member for centering the operator handle when the solenoid is energized.

Another embodiment of the present invention is a joystick capable of being electrically centered which comprises an operator handle mounted to a pivotal member, the operator handle for moving the pivotal member about an arc, a position sensor associated with the pivotal member with the position sensor capable of determining the amount of movement of the pivotal member about the arc, a linear solenoid having a pair of plunger members each being positioned within the solenoid on opposite sides of the solenoid, the plunger members capable of moving within the solenoid once the solenoid is energized, and a cable member connected to the operator handle and the plunger members with energizing the solenoid causing the plunger members to move within the solenoid and causing the cable member to center the operator handle.

In another embodiment of the present invention a joystick comprises an operator member mounted to a pivotal member, the operator member for moving the pivotal member, a position sensor associated with the pivotal member, a linear solenoid having a pair of plunger members each being positioned within the solenoid on opposite sides of the solenoid, a compression spring associated with each of the plunger members, and a cable member connected to the operator member and the plunger members with the cable member for centering the operator member when the solenoid is energized and the compression springs for centering the operator member prior to the solenoid being energized.

BEST MODE FOR CARRYING OUT THE INVENTION

Figure 1:
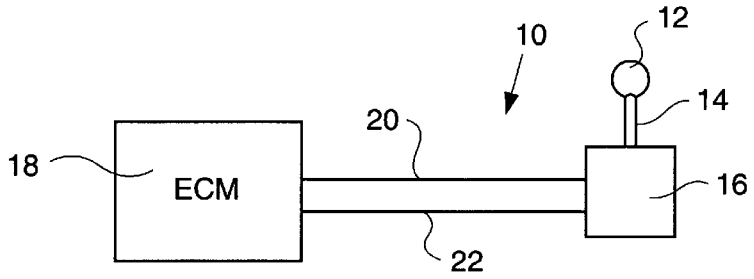
FIG. 1 is a perspective view of a joystick constructed according to the present invention with the joystick connected to an electronic control module.

Referring now to the drawings, FIG. 1 illustrates a joystick 10 constructed according to the present invention with the joystick 10 having a knob 12 and a handle 14 with the handle 14 being mounted within a housing 16. The housing 16 is shown to be connected to an electronic control module (ECM) 18 by a pair of leads 20 and 22. The ECM 18 is a control module having a microprocessor (not shown) or other suitable electronic circuitry for receiving and transmitting signals over the leads 20 and 22 for controlling operation or determining the position of the joystick 10. As is known, the knob 12 and the handle 14 may be manually manipulated to be moved or pivoted in any direction which an operator desires, such as side-to-side, left-to-right, fore-to-aft, or forward-to-backward. Movement of the knob 12 and the handle 14 is sensed by the ECM 18 which is used to control operation of a machine (not shown). The handle 14 is normally maintained in a center or home position. Additionally, the handle 14 may be operated about an arc of movement or displacement with an example being a displacement of 30° off center in either direction of movement or travel of the handle 14.

Figure 2:
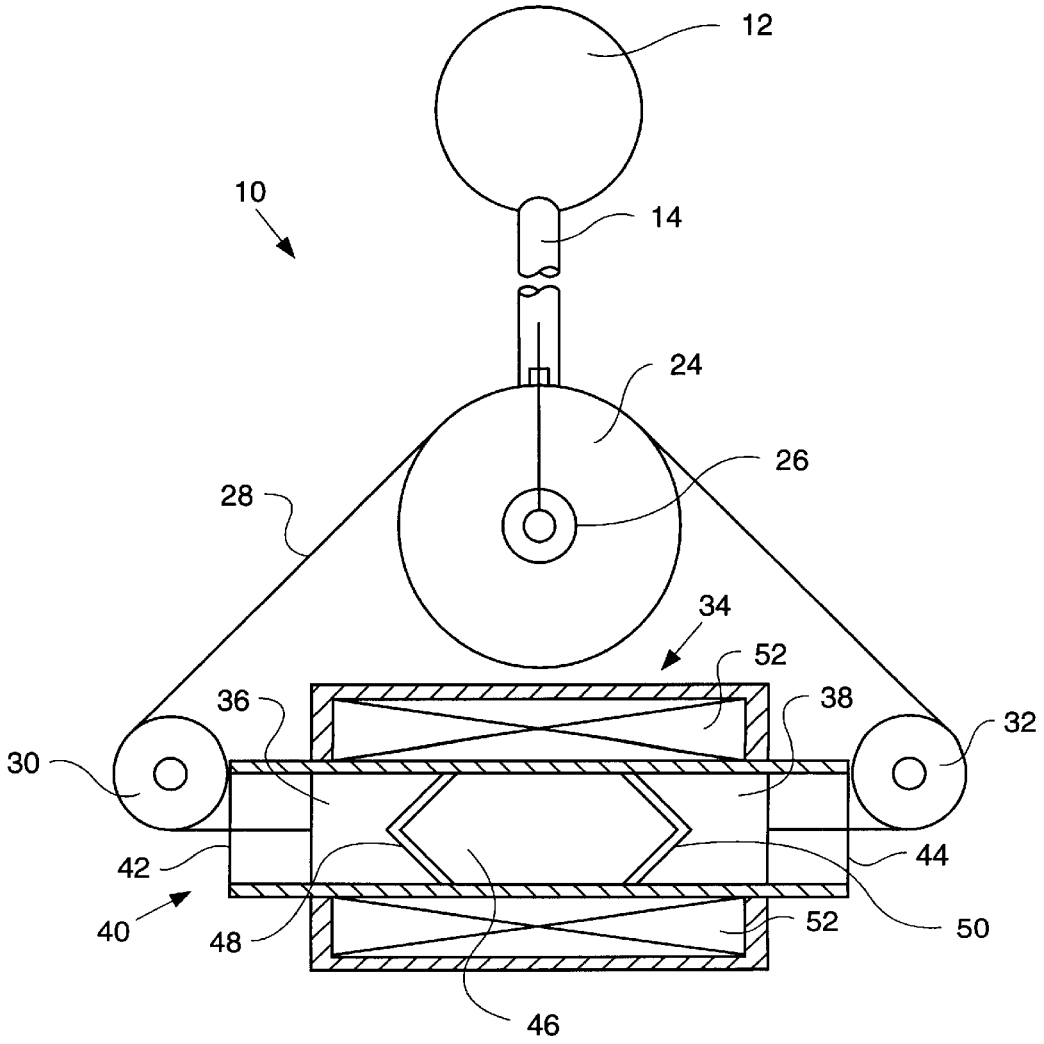
FIG. 2 is a partial cross-sectional diagram of the joystick constructed according to the present invention.

Further details of the joystick 10 are illustrated in FIG. 2. The joystick 10 comprises the knob 12 and the handle 14 with the handle 14 being connected to a drum or a pivotal member 24. The pivotal member 24 is connected to a position sensor 26 which is used to determine how far the handle 14 has been moved by an operator of the joystick 10. A flexible member such as a cable 28 is tangentially connected to the pivotal member 24. The cable 28 may be composed of a metal band or a flexible non-stretchable member. The cable 28 is capable of having constant length under tension. The cable 28 is wrapped around a pair of rotatable or movable members 30 and 32 and through a linear solenoid 34.

The linear solenoid 34 has a pair of plunger members 36 and 38 which are positioned within a tube or a bore 40 in the sides 42 and 44 of the linear solenoid 34. The linear solenoid 34 also has a centrally located fixed pole piece 46 which has tapered ends 48 and 50. The linear solenoid 34 further includes a coil 52 which may be energized by providing a current through the coil 52. The plunger members 36 and 38 are also connected to the cable 28.

In operation, the joystick 10 is turned on and current is provided through the coil 52. The linear solenoid 34 is energized which causes the plunger members 36 and 38 to be attracted into the linear solenoid 34. Once the plunger members 36 and 38 are attracted into the linear solenoid 34 the cable 28 also moves which then centers the handle 14. Additionally, once the joystick 10 is centered, movement of the handle 14 off of the center position in either direction causes one of the plunger members 36 or 38 to move out of the linear solenoid 34. This causes one air gap to be created in a magnetic circuit within the linear solenoid 34. The ECM 18 is able to provide current to the coil 52 to energize the coil 52.

Figure 3:
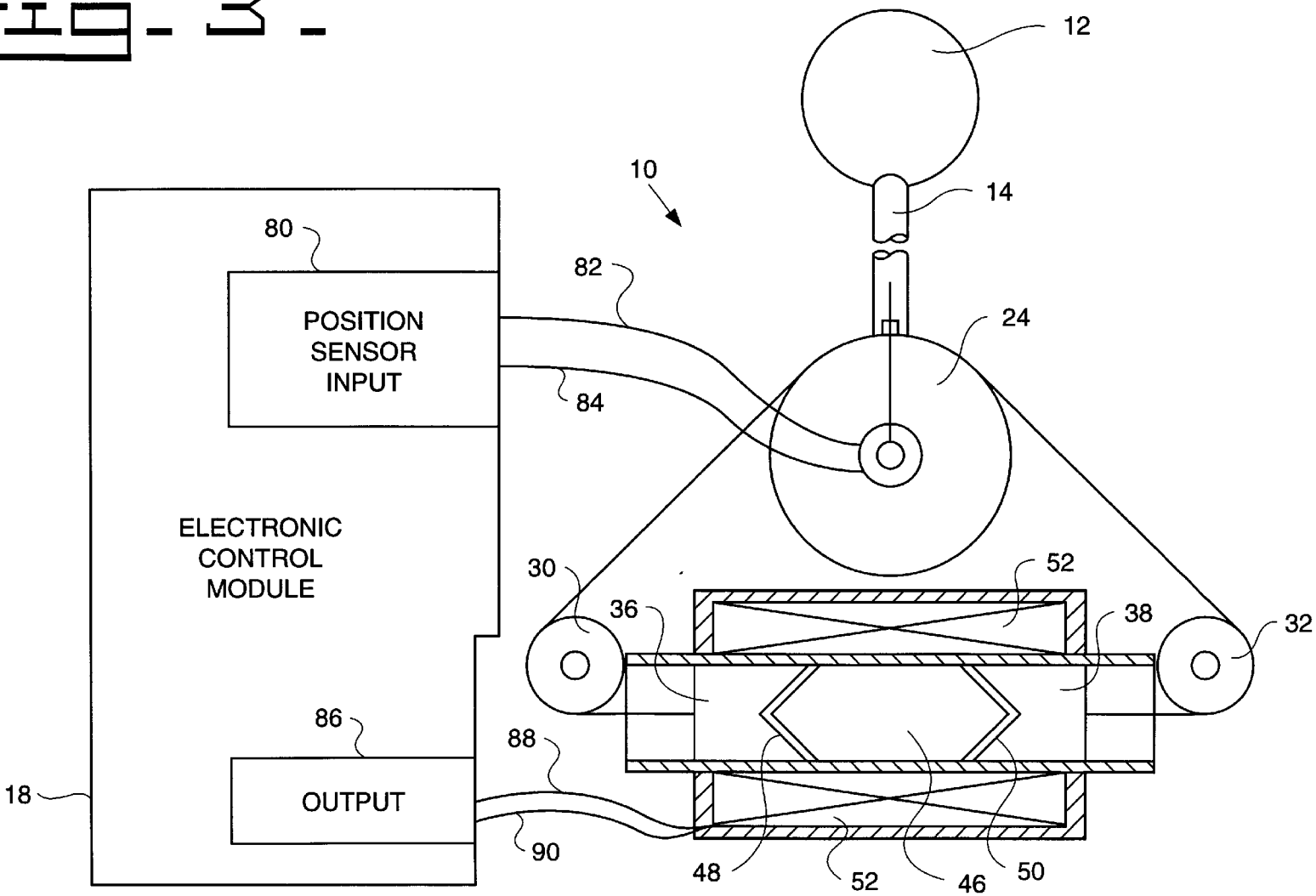
FIG. 3 is a partial cross-sectional diagram of the joystick shown in FIG. 2 with the joystick shown connected to the electronic control module.

Referring now to FIG. 3, the joystick 10 is shown connected to the ECM 18. The position sensor 26 is connected to a position sensor input 80 of the ECM 18 by a pair of leads 82 and 84. The coil 52 is connected to an output 86 of the ECM 18 by a pair of leads 88 and 90. For example, the output 86 of the ECM 18 may be a pulse width modulated signal having a 0% to 100% duty cycle. In operation, the coil 52 is initially energized by sending a current at the output 86 over the leads 88 and 90. Once the coil 52 is energized the plunger members 36 and 38 are pulled into the linear solenoid 34. Pulling the plunger members 36 and 38 into the linear solenoid 34 also pulls the cable 28 to center the handle 14. Signals sent over the leads 82 and 84 from the position sensor 26 inform the ECM 18 which direction the handle 14 has been moved.

Figure 4:
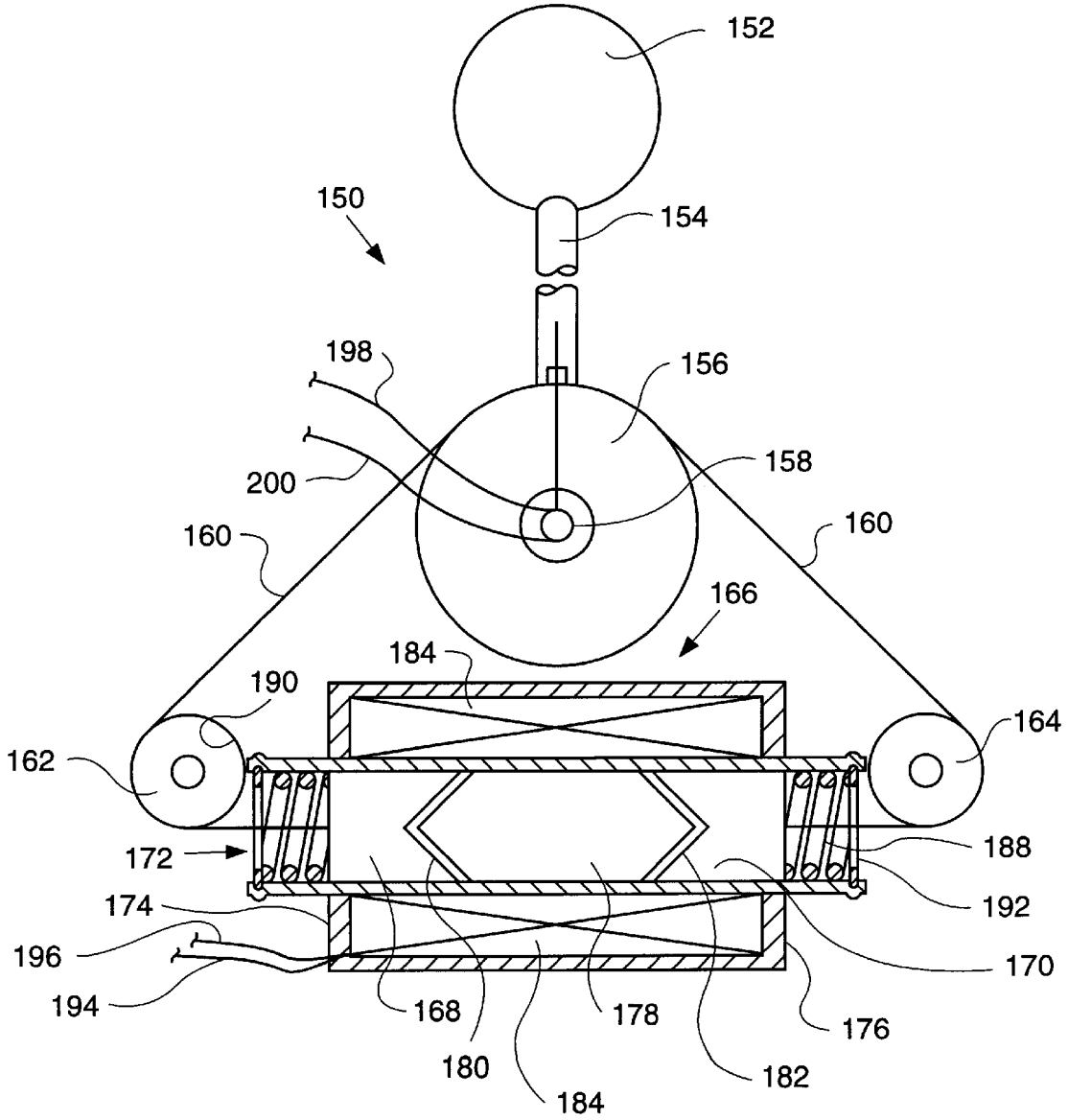
FIG. 4 is a partial cross-sectional diagram of an alternate embodiment of a joystick constructed according to the present invention.

FIG. 4 illustrates an alternate embodiment of a joystick 150 constructed according to the present invention. The joystick 150 includes the knob 152 and the handle 154 with the handle 154 being connected to a drum or a pivotal member 156. The pivotal member 156 is connected to a position sensor 158 which is used to determine how far the handle 154 has been moved by an operator of the joystick 150. A flexible member such as a cable or a metal band 160 is tangentially connected to the pivotal member 156. The cable 160 is wrapped around a pair of rotatable or movable members 162 and 164 and through a linear solenoid 166.

The linear solenoid 166 has a pair of plunger members 168 and 170 which are positioned within a tube or a bore 172 in the sides 174 and 176 of the linear solenoid 166. The linear solenoid 166 also has a centrally located fixed pole piece 178 which has tapered ends 180 and 182. The linear solenoid 166 further includes a coil 184 which may be energized by providing a current through the coil 184. The plunger members 168 and 170 are also connected to the cable 160. The plunger members 168 and 170 are each further biased by a compression spring 186 and 188 placed within the tube 172 with the compression springs 186 and 188 providing a residual centering force prior to current being applied to the linear solenoid 166. Each of the compression springs 186 and 188 are held in place within the tube 172 between the plunger members 168 and 170 and a snap ring 190 and 192, respectively.

The joystick 150 may also be connected to the ECM 18 which is not shown in FIG. 4. The coil 184 may be connected to the ECM 18 via a pair of leads 194 and 196. Current provided from the ECM 18 over the leads 194 and 196 is used to energize the coil 184. Additionally, the position sensor 158 is connected to the ECM 18 by wires 198 and 200. Signals provided over the wires 198 and 200 from the position sensor 158 are indicative of the direction in which the handle 154 has been moved by an operator.

In operation, prior to current being provided to the coil 184, the compression springs 186 and 188 center the handle 154. Once current is applied to the coil 184 the plunger members 168 and 170 will be attracted into the linear solenoid 166 which pulls the cable 160 to further center the handle 154. Once the joystick 150 is centered movement of the handle 154 off of the center position in either direction will cause one of the plunger members 168 or 170 to move out of the linear solenoid 166. Once either of the plunger members 168 or 170 moves out of the linear solenoid 166 an air gap will be created in a magnetic circuit set up by the linear solenoid 166.

The joysticks 10 and 150 have been shown for movement in a single direction or axis. It is also contemplated and possible that a joystick may be constructed for dual axis operation. In order to construct such a joystick, the drum 24 would be replaced by a sphere and a second linear solenoid which would be perpendicular to the linear solenoid 34 would be required. Additional inputs and outputs to the ECM 18 would also be required.

INDUSTRIAL APPLICABILITY

The present invention is applicable in situations where an operator is using an electronic joystick and needs to be provided with tactile feedback. The present invention is useful to provide a residual centering force prior to operation of the joystick. Additionally, torque curves associated with a linear solenoid having tapered pole pieces increases as the joystick approaches the neutral or center position. This characteristic provides operation of the joystick at greatly reduced power at lower angles of displacement of the joystick. Even at 30 degrees displacement from center the linear solenoid having tapered pole pieces will compare favorably with more expensive rotary solenoids for torque versus power.

Other aspects, objects and advantages of the present invention can be obtained from a study of the drawings, the disclosure and the appended claims.

I claim:

1. A joystick comprising:

an operator member mounted to a pivotal member, the operator member for moving the pivotal member;

a position sensor associated with the pivotal member;

a linear solenoid having a pair of plunger members each being positioned within the solenoid on opposite sides of the solenoid; and a cable member connected to the operator member and the plunger members with the cable member for centering the operator member when the solenoid is energized.

2. The joystick of claim 1 further comprising an electronic control module connected to the joystick for receiving signals corresponding to the amount of movement that the operator member has been moved and for energizing the linear solenoid.

3. The joystick of claim 2 wherein the electronic control module is connected to the position sensor.

4. The joystick of claim 3 wherein the linear solenoid further comprises a coil and the electronic control module is connected to the coil.

5. The joystick of claim 1 wherein the linear solenoid comprises a fixed pole piece with the pole piece having a pair of tapered ends.

6. The joystick of claim 1 wherein the cable member is tangentially connected to the pivotal member.

7. The joystick of claim 1 further comprising a pair of rotatable members with the cable member being placed around the rotatable members.

8. A joystick capable of being electrically centered, the joystick comprising:

an operator handle mounted to a pivotal member, the operator handle for moving the pivotal member about an arc;

a position sensor associated with the pivotal member with the position sensor capable of determining the amount of movement of the pivotal member about the arc;

a linear solenoid having a pair of plunger members each being positioned within the solenoid on opposite sides of the solenoid, the plunger members capable of moving within the solenoid once the solenoid is energized; and a cable member connected to the operator handle and the plunger members with energizing the solenoid causing the plunger members to move within the solenoid and causing the cable member to center the operator handle.

9. The joystick of claim 8 further comprising an electronic control module connected to the joystick for receiving signals corresponding to the amount of movement that the operator handle has been moved and for energizing the linear solenoid.

10. The joystick of claim 9 wherein the electronic control module is connected to the position sensor.

11. The joystick of claim 10 wherein the linear solenoid further comprises a coil and the electronic control module is connected to the coil.

12. The joystick of claim 8 wherein the linear solenoid comprises a fixed pole piece with the pole piece having a pair of tapered ends.

13. The joystick of claim 8 wherein the cable member is tangentially connected to the pivotal member.

14. The joystick of claim 8 wherein the pivotal member is capable of moving in a forward or a backward direction and the arc of travel is 30° in either direction.

15. A joystick comprising:

an operator member mounted to a pivotal member, the operator member for moving the pivotal member;

a position sensor associated with the pivotal member;

a linear solenoid having a pair of plunger members each being positioned within the solenoid on opposite sides of the solenoid;

a compression spring associated with each of the plunger members; and a cable member connected to the operator member and the plunger members with the cable member for centering the operator member when the solenoid is energized and the compression springs for centering the operator member prior to the solenoid being energized.

16. The joystick of claim 15 further comprising an electronic control module connected to the joystick for receiving signals corresponding to the amount of movement that the operator member has been moved and for energizing the linear solenoid.

17. The joystick of claim 15 wherein the linear solenoid comprises a fixed pole piece with the pole piece having a pair of tapered ends.

18. The joystick of claim 15 wherein the cable member is tangentially connected to the pivotal member.

19. The joystick of claim 15 further comprising a pair of rotatable members with the cable member being placed around the rotatable members.

20. The joystick of claim 15 wherein the cable member is a flexible member and non-stretchable.

* * * * *